Jan. 28, 1947.  B. F. WHEELER  2,414,991
OSCILLATION GENERATOR
Filed April 7, 1944

INVENTOR.
BENJAMIN F. WHEELER
BY H. S. Grover
ATTORNEY

Patented Jan. 28, 1947

2,414,991

UNITED STATES PATENT OFFICE 2,414,991

OSCILLATION GENERATOR

Benjamin Frederick Wheeler, Haddonfield, N. J., assignor to Radio Corporation of America, a corporation of Delaware Application April 7, 1944, Serial No. 530,074

9 Claims. (Cl. 250—36)

The present invention relates to oscillation generators, and has for its primary object to provide a simple, mechanically rugged and inexpensive circuit for a vacuum tube oscillator.

Difficulties have heretofore been experienced in employing conventional lumped capacitor elements in vacuum tube oscillation generator circuits at high frequencies in the range of thirty megacycles or higher. Due to the high circulating tank currents, conventional capacitors made with solid dielectrics tend to heat up in an undesirable manner unless made quite large. Air capacitors, on the other hand, become very large and do not lend themselves readily for use in a compact mechanical construction. In addition, the use of large circuit elements causes undesirable stray capacitances to ground.

The present invention overcomes the foregoing difficulties by employing tubular conductors having large heat dissipation surfaces, and utilizing these conductors as the electrodes for capacitors, and by using air dielectric capacitors in an economical space arrangement. By arranging the conductors concentrically, the capacitors have large surfaces and are compact in width, and take no more space since they are "inside" the inductive elements. Moreover, the constructional arrangement of the invention has the advantageous characteristics of being mechanically rugged, simple to construct, and relatively inexpensive. By suitable choice of dimensions, it is possible to obtain lower capacitive reactances for a given length than would otherwise be possible with a coaxial capacitor. This is due to the transmission line action at higher frequencies.

Figure 1:
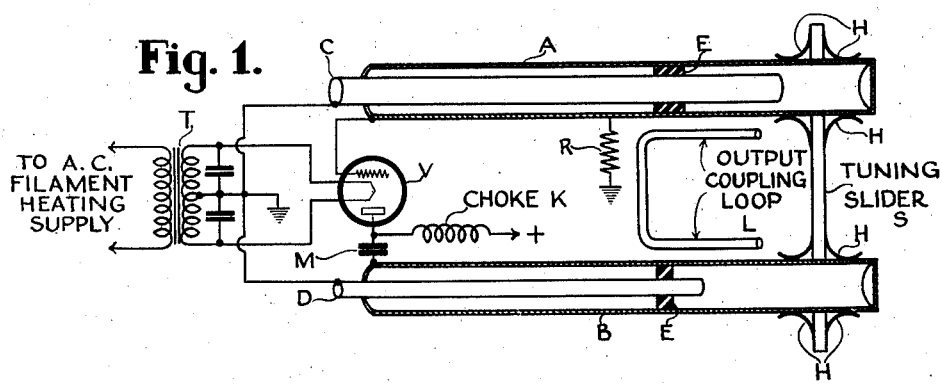
Figure 2:
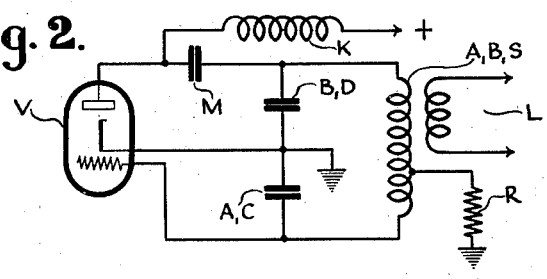
Figure 3:
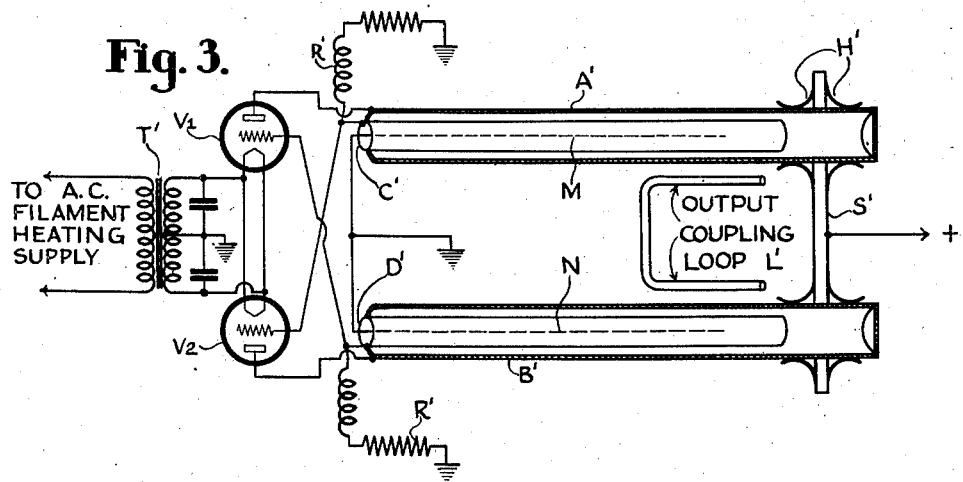
Figure 4:
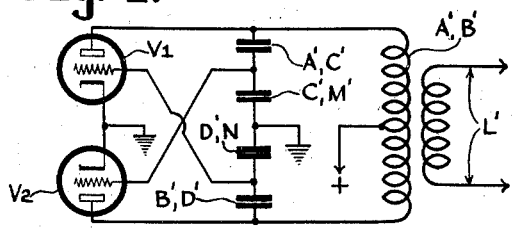

The following is a detailed description of the invention, in conjunction with a drawing, wherein:

Figs. 1 and 3 illustrate single ended and push-pull oscillation generators constructed in accordance with the principles of the invention; and Figs. 2 and 4 illustrate the equivalent electrical circuits of Figs. 1 and 3, respectively, for one adjustment or design of the lengths of the concentric conductors.

Referring to Fig. 1, there is shown an oscillation generator system comprising a vacuum tube V having an inductance element composed of a pair of parallel tubular conductors A, B short-circuited near one end by a metallic slider S, and a pair of tubular conductors or rods C, D within the interiors of the conductors A, B. Inner conductor C is located within tubular outer conductor A and spaced therefrom by means of one or more insulating bushings E. Inner conductor D is located within tubular outer conductor B and spaced therefrom by means of one or more ring insulator bushings E. Conductors A and C are in capacitive coupling relation, and conductors B and D are in capacitive coupling relation, and the values of the capacities between A and C and between B and D are determined by the lengths of the conductors C and D and also by the ratio of the diameters between the inner and outer conductors, and by the operating frequency. The slider S is adjustable over the lengths of conductors A and D and makes direct electrical contact with the outer surfaces thereof by means of spring-like fingers H.

The anode of vacuum tube V is supplied with a positive polarizing potential through a choke coil K. The filament is supplied with heating current from an alternating current source which is coupled to the primary winding of a transformer T. A grid bias resistor R is connected to a voltage nodal point on the conductor A. A blocking and by-pass condenser M isolates the anode of tube V from conductor B for direct current. Output is taken from the oscillator by means of conducting loop L whose legs are inductively coupled to the conductors A and B.

By making the lengths of conductors A and B less than one-quarter of a wavelength at the operating frequency as measured from the slider S to the ends of the conductors which are nearest the vacuum tube electrodes, and by making the lengths of conductors C and D also less than one-quarter of a wavelength at the operating frequency, the result is a Colpitts oscillator whose equivalent electrical circuit is shown in Fig. 2. Conductors A and B, when less than a quarter wavelength and shorted by slider S, constitute an inductance, while conductors A and C, and B and D act as effective capacitances. The parts of Fig. 2 which correspond to those of Fig. 1 have been given the same reference numerals.

The same result of a Colpitts oscillator is obtained if the lengths of conductors A, B, C and D are made less than any odd multiple of a quarter wavelength but greater than the next lower even multiple of a quarter wavelength. For example, the conductors may have a length between one-half wavelength $$\left(\frac{\lambda}{2}\right)$$

and three-quarters wavelength $$\left(\frac{3\lambda}{4}\right)$$

or between one whole wavelength (λ) and five-quarters wavelengths $$\left(\frac{5\lambda}{4}\right)$$

It is usually preferred, however, that the conductors be less than one-quarter wavelength for reasons of compactness.

By taking the lengths of conductors A, B (as measured from the slider S to the vacuum tube V), C and D all greater than one-quarter wavelength but less than one-half wavelength, or greater than any odd multiple of one-quarter wavelength (excluding unity) but less than the next even multiple quarter wavelength, the oscillator will then function in a manner somewhat similar to a Hartley oscillator. Conductors A and B with their short circuiting slider then act as an effective capacitance while A and C, and B and D act as effective inductances.

If desired, the lengths of conductors C and D may be made adjustable by means well known in the art, such as, for example, by means of movable metallic pistons or plugs in the ends located in the interiors of the surrounding tubular conductors A and B.

Fig. 3 illustrates a push-pull type of oscillator designed in accordance with the principles of the invention stated above, and Fig. 4 illustrates one equivalent electrical circuit of Fig. 3, when the lines of Fig. 3 have such lengths as to make the system function as a Colpitts oscillator. The equivalent parts of Figs. 3 and 4 have been given the same reference numerals.

The push-pull oscillator of Fig. 3 comprises a pair of vacuum tubes V1 and V2 whose anodes are respectively connected directly to the ends of tubular conductors A' and B'. The effective lengths of conductors A' and B' are adjusted by means of metallic slider S' having spring-like fingers H' contacting the outer surfaces of these conductors. The grid of vacuum tube V1 is connected to one end of tubular conductor D' located within the interior of tubular conductor B', while the grid of vacuum tube V2 is directly connected to the corresponding end of tubular conductor C' which is located in the interior of tubular conductor A'. Due to the spacing between conductors A' and C' and the other factors mentioned above; i. e., length, ratio of diameter, and frequency, there is a capacitive relation therebetween, and due to the spacing between conductors B' and D' there is also a capacitive relation between these last conductors. The value of these capacitors is of course determined by the lengths of their tubular conductors and their respective diameters and the operating frequency. In the interiors of conductors C' and D', and in spaced relation thereto in order to form additional capacitors, are tubular or rod-like conductors M and N, respectively. Conductors M and N are directly connected together at one end, as shown, and connected to ground. Insulating spacers may be used for supporting the conductors in the proper relation.

The filaments of vacuum tubes V1 and V2 are supplied with heating current over transformer T'. The grids of these two vacuum tubes have individual bias resistors R' and choke coils in circuit therewith. The anodes are supplied with positive polarizing potentials from a source of unidirectional supply connected to the midpoint of metallic slider S'.

When the conductors A', B', C', D', M and N are less than one-quarter wavelength long at the operating frequency, the system functions as a Colpitts push-pull oscillator whose mode of operation is evident from an inspection of the equivalent circuit of Fig. 4. The capacitors formed by conductors C', M and D', N control the degree of excitation of the vacuum tubes, and by making these capacitors variable by adjusting the effective lengths of M and N within C' and D', it is possible to vary the grid excitation of the vacuum tubes.

By making the conductors A', B', C', D', M and N greater than one-quarter wavelength long but less than one-half wavelength, the oscillator of Fig. 3 will function in a manner somewhat similar to a Hartley push-pull oscillator.

The same principles recited above in connection with Fig. 1 as to odd multiples greater than one-quarter wavelength also apply to the system of Fig. 3.

It should be noted that the conductors of the oscillators of Figs. 1 and 3 have large surface areas, and thus large heat dissipating properties. Due to the construction of these conductors, they are inherently rugged from a mechanical standpoint and relatively simple to put together. The dimensions are easily calculated for any frequency of operation. The tuned circuit can be made to have a high Q.

In one embodiment of the invention tried out in practice, the oscillator was a fixed frequency Colpitts type and generated oscillations of the order of 30 megacycles with approximately one kilowatt power. The invention, however, is not limited to any particular frequency of operation.

In some cases it may be desirable to fill the space between the conductors with a dielectric material to increase the voltage breakdown without increasing the diameters. Even if this is done, however, the coaxial line type capacitor shows greater current handling ability than the usual mica capacitor construction due to the relatively thin dielectric wall being adjacent to the large outer conductor with its large heat dissipating ability.

When such a dielectric material is used, the capacitive reactance is affected in two ways: First, inversely as the square root of the dielectric constant, and secondly, in its effect on the electrical length of the conductors which increases in proportion to the square root of the dielectric constant. In this case it is the electrical length, not the physical length that is referred to hereinabove, where reference is made to lengths greater or less than one-quarter wavelength or odd multiple thereof.

What is claimed is:

1. A high frequency electron discharge device system comprising a pair of tubular conductors connected at one end to different electrodes of said discharge device system and short circuited at points near the other end by a conducting slider to thereby constitute an effective inductance, a conductor within each of said tubular conductors and extending over the major portion of the length thereof and insulated over its entire length therefrom to constitute with the surrounding tubular conductor a coaxial line type of capacitor, and connections from those ends of said interior conductors which are adjacent said one end of the tubular conductors to at least one other electrode of said discharge device system.

2. An electron discharge device system in accordance with claim 1, characterized in this that said pair of tubular conductors are effectively less than one-quarter wavelength to constitute an inductance, and said inner conductors are effectively less than one-quarter wavelength to constitute a capacitance.

3. A high frequency oscillator comprising a vacuum tube having a grid, an anode and a filament, a pair of parallel tubular conductors connected at one end to said grid and anode, a radio frequency short-circuiting element connected across said tubular conductors at points removed from said one end, a conductor in the interior of each of said tubular conductors and extending over an appreciable portion of the length thereof at the operating frequency, each of said interior conductors being respectively insulated over its entire length from its surrounding conductor to constitute therewith a coaxial line type of capacitor, and connections from corresponding ends of said interior conductors to said filament.

4. A high frequency electron discharge device system comprising a vacuum tube having a grid, an anode and a filament, a pair of parallel tubular conductors connected at one end to said grid and anode, a radio frequency short-circuiting element connected across said tubular conductors at points removed from said one end, a conductor in the interior of each of said tubular conductors and extending over an appreciable portion of the length thereof at the operating frequency, each of said interior conductors being respectively insulated over its entire length from its surrounding conductor to constitute therewith a coaxial line type of capacitor, and connections from corresponding ends of said interior conductors to said filament, the effective lengths of each of said tubular connductors and the interiorly located conductors being less than one-quarter wavelength at the operating frequency.

5. A high frequency oscillator comprising a vacuum tube having a grid, an anode and a filament, a pair of parallel tubular conductors connected at one end to said grid and anode, a radio frequency short-circuiting element connected across said tubular conductors at points removed from said one end, a conductor in the interior of each of said tubular conductors and extending over an appreciable portion of the length thereof at the operating frequency, each of said interior conductors being respectively insulated over its entire length from its surrounding conductor to constitute therewith a coaxial line type of capacitor, and connections from corresponding ends of said interior conductors to said filament, the effective lengths of each of said tubular conductors and the interiorly located conductors being greater than one-quarter wavelength but less than one-half wavelength at the operating frequency.

6. A push-pull high frequency electron discharge device system comprising first and second vacuum tube electrode structures, each having a grid, an anode and a cathode, first and second tubular conductors arranged physically parallel to each other, a connection from the anode of said first structure to one end of said first tubular conductor, a connection from the anode of said second structure to the corresponding end of said second tubular conductor, a radio frequency short-circuiting element across said tubular conductors at points removed from said anodes, a third tubular conductor within said first conductor and spaced therefrom along its entire length to constitute a capacitor therewith, a fourth tubular conductor within said second conductor and spaced along its entire length to constitute a capacitor therewith, a connection from one end of said third conductor to the grid of said second structure, a connection from the corresponding end of said fourth conductor to the grid of said first structure, and means for capacitively coupling said third and fourth conductors to said filament.

7. A push-pull high frequency electron discharge device system comprising first and second vacuum tube electrode structures, each having a grid, an anode and a cathode, first and second tubular conductors arranged physically parallel to each other, a connection from the anode of said first structure to one end of said first tubular conductor, a connection from the anode of said second structure to the corresponding end of said second tubular conductor, a radio frequency short-circuiting element across said tubular conductor at points removed from said anodes, a third tubular conductor within said first conductor and spaced therefrom along its entire length to constitute a capacitor therewith, a fourth tubular conductor within said second conductor and spaced therefrom along its entire length to constitute a capacitor therewith, a connection from one end of said third conductor to the grid of said second structure, a connection from the corresponding end of said fourth conductor to the grid of said first structure, conductors in the interiors of said third and fourth tubular conductors and spaced therefrom to constitute capacitors therewith, a direct connection between one end of the conductor within said third conductor and the corresponding end of the conductor within said fourth conductor, and means connecting said last connection and said filament.

8. An electron discharge device system in accordance with claim 1, characterized in this that said pair of tubular conductors are effectively greater than one-quarter wavelength but less than one-half wavelength at the operating frequency to constitute a capacitance, and said inner conductors are also effectively greater than one-quarter wavelength but less than one-half wavelength to constitute an inductance.

9. A high frequency electron discharge device system comprising an electric tube having grid, anode and cathode electrodes, a pair of tubular conductors connected at one end to said grid and anode and short circuited at points intermediate the ends by a slider providing low impedance to energy of the operating frequency, a conductor within each of said tubular conductors and extending over the major portion of the length thereof and insulated over its entire length therefrom to constitute with the surrounding tubular conductor a coaxial line type of capacitor, and connections from those ends of said interior conductors which are adjacent said one end of the tubular conductors to said cathode.

BENJAMIN FREDERICK WHEELER.